US012460370B2

(12) United States Patent
Wang et al.

(10) Patent No.: US 12,460,370 B2
(45) Date of Patent: Nov. 4, 2025

(54) MOISTURE-PROOF STRUCTURE

(71) Applicant: Jingzhuo Wang, Mianyang (CN)

(72) Inventors: Jingzhuo Wang, Mianyang (CN); Haoping Chen, Mianyang (CN)

(73) Assignee: Jingzhuo Wang, Mianyang (CN)

( * ) Notice: Subject to any disclaimer, the term of this patent is extended or adjusted under 35 U.S.C. 154(b) by 0 days.

(21) Appl. No.: 19/064,655

(22) Filed: Feb. 26, 2025

(65) Prior Publication Data

US 2025/0198112 A1 Jun. 19, 2025

Related U.S. Application Data

(63) Continuation of application No. PCT/CN2022/127874, filed on Oct. 27, 2022.

(51) Int. Cl.

*E02D 31/02* (2006.01)
*E02D 27/32* (2006.01)
*E02D 17/20* (2006.01)

(52) U.S. Cl.

CPC ............. *E02D 31/02* (2013.01); *E02D 27/32* (2013.01); *B32B 2419/02* (2013.01); *E02D 17/205* (2013.01)

(58) Field of Classification Search

CPC ..... E02D 31/02; B32B 18/00; B32B 2419/02; E04B 1/02; E04C 3/30
USPC ........................................................ 52/561
See application file for complete search history.

(56) References Cited

U.S. PATENT DOCUMENTS 4,312,164 A * 1/1982 Walt .......................... E04B 1/78 52/561
5,548,938 A * 8/1996 Scheiwiller ............... E04B 2/46 52/592.1
5,624,211 A * 4/1997 Anderson ................. E04B 2/22 405/262
5,937,610 A * 8/1999 Behunin ............... E04G 21/202 52/745.1
6,205,726 B1 * 3/2001 Hoadley .................. E04B 2/16 52/592.6
8,256,182 B2 * 9/2012 Wolter ...................... E04B 2/04 52/561

(Continued)

FOREIGN PATENT DOCUMENTS

CN 202187369 U 4/2012
CN 204754074 U 11/2015

(Continued)

OTHER PUBLICATIONS

Internation Search Report of PCT/CN2022/127874, Mailed Jun. 12, 2023.

*Primary Examiner* — Paola Agudelo

(57) ABSTRACT

A moisture-proof structure comprises a first fire brick layer, a second fire brick layer, a third fire brick layer, a fourth fire brick layer, a fifth fire brick layer and a floor/ceramic tile layer arranged from bottom to top. The five fire brick layers are all laid by using stretcher bond, the fourth fire brick layer is laid by using a means of header bond, upper and lower layers of the first fire brick layer, the second fire brick layer, the third fire brick layer, the fourth fire brick layer and the fifth fire brick layer are bonded by using a cement slurry, a gap between fire bricks of the first fire brick layer is filled with lime powder and fire bricks of the fourth fire brick layer and the fifth fire brick layer are closely connected.

4 Claims, 4 Drawing Sheets

(56) References Cited

U.S. PATENT DOCUMENTS

| | | | | |
|---|---|---|---|---|
| 2002/0162295 | A1* | 11/2002 | Keshmiri | E04C 2/382 52/653.1 |
| 2008/0202051 | A1* | 8/2008 | Roehrig | E04C 1/41 52/561 |
| 2008/0272270 | A1* | 11/2008 | Robin | E04B 2/26 52/745.09 |
| 2009/0158675 | A1* | 6/2009 | Sourlis | E04B 1/72 52/169.5 |
| 2012/0247061 | A1* | 10/2012 | Scheckler | E04B 2/16 52/745.1 |
| 2014/0154012 | A1* | 6/2014 | Chen | E02B 7/02 405/116 |
| 2016/0090739 | A1* | 3/2016 | Johnson | E04C 3/34 52/561 |
| 2017/0292265 | A1* | 10/2017 | Winter | E04B 2/26 |
| 2019/0309497 | A1* | 10/2019 | Curtis | E21D 11/08 |
| 2020/0080273 | A1* | 3/2020 | Li | E02D 29/0208 |

FOREIGN PATENT DOCUMENTS

| | | | |
|---|---|---|---|
| CN | 108797931 | A | 11/2018 |
| CN | 109489109 | A | 3/2019 |
| CN | 211548589 | U | 9/2020 |
| CN | 111851938 | A | 10/2020 |
| CN | 214530810 | U | 10/2021 |
| DE | 202015004314 | U1 | 8/2015 |

* cited by examiner

Second and third layers

Fourth layer

Fifth layer

MOISTURE-PROOF STRUCTURE

CROSS-REFERENCE TO RELATED APPLICATIONS

This application is a continuation of International Patent Application No. PCT/CN2022/127874 with a filing date of Oct. 27, 2022, designating the United States, now pending, and further claims priority to Chinese Patent Application No. 202211284736. 7 with a filing date of Oct. 17, 2022. The content of the aforementioned applications, including any intervening amendments thereto, are incorporated herein by reference.

TECHNICAL FIELD

The present invention relates to the technical field of building decoration, and particularly to a moisture-proof structure.

BACKGROUND OF THE PRESENT INVENTION

China has a population of more than 1 billion, and thousands of people suffer from housing humidity, wherein the housing humidity mainly refers to the humidity of floor of the first layer of building. The humidity of floor of the first layer of building is mainly caused by the following reasons:

1. function of condensed water: when air in summer is relatively high in temperature and relatively high in humidity, an indoor floor is relatively low in temperature, and external hot air enters the room and condenses into small water droplets when encountering with the cold floor; and
2. function of underground water: because of high outdoor temperature and low underground water level, there is abundant underground water, which causes a capillary phenomenon of water under the ground, and the underground water surges up along capillary holes in the floor, thus causing floor humidity or partial water accumulation.

At present, the structure of floor of the first layer of building comprises a foundation, a cushion layer and a surface layer, and the traditional building structure cannot effectively prevent moisture for a long time, which brings many inconveniences to people's health.

Aiming at the above problem, the application Ser. No. 201120275042. 8 discloses a moisture-proof structure, which sequentially comprises a rammed earth layer, a cushion layer and a surface layer, wherein the cushion layer sequentially consists of a crushed stone compaction layer and a leveling layer, a moisture-proof layer is arranged between the leveling layer and the surface layer, and the moisture-proof layer is an extruded polystyrene board. The extruded polystyrene board has a compact closed-cell honeycomb structure, so that the board can avoid absorbing water and has good water resistance.

The above solution has a very good blocking effect on moisture caused by water surging from the ground, and can effectively prevent the moisture; and however, the solution cannot prevent moisture caused by water droplets and vapor produced by the condensation of moisture in air when encountering with the cold floor.

Therefore, in view of the technical problem described above, there is an urgent need for a moisture-proof structure that can prevent air from condensing when encountering with the cold floor and prevent the underground water from surging up.

SUMMARY OF THE PRESENT INVENTION

The technical problem to be solved by the present invention is to overcome the defects in the above technology and to provide a moisture-proof structure, and is intended to achieve the technical effects of ventilation and moisture removal through the principle that fire bricks are stacked into multiple layers and densely distributed air channels which are vertically and horizontally staggered are formed at a gap between the fire bricks, and meanwhile, the technical problem of indoor humidity is objectively solved by using the disinfection and sterilization effects of lime and the characteristic of being warm in winter and cool in summer of the fire bricks.

In order to solve the above technical problem, the present invention provides the technical solution that: a moisture-proof structure comprises a first fire brick layer, a second fire brick layer, a third fire brick layer, a fourth fire brick layer, a fifth fire brick layer, and a floor/ceramic tile layer which are arranged from bottom to top;

wherein, the first fire brick layer, the second fire brick layer, the third fire brick layer, and the fifth fire brick layer are all laid by using stretcher bond, the fourth fire brick layer is laid by using a means of header bond, upper and lower layers of the first fire brick layer, the second fire brick layer, the third fire brick layer, the fourth fire brick layer, and the fifth fire brick layer are bonded by using a cement slurry, a gap between fire bricks of the first fire brick layer is filled with lime powder, and fire bricks of the fourth fire brick layer and the fifth fire brick layer are closely connected.

Further, when the floor/ceramic tile layer is laid with a wooden floor, a lime layer is laid between the floor/ceramic tile layer and the fifth fire brick layer).

Further, when the floor/ceramic tile layer is laid with ceramic tiles, a cement mortar is laid between the floor/ceramic tile layer and the fifth fire brick layer.

Compared with the prior art, the present invention has the advantages that: according to the present invention, multiple layers of fire bricks are laid on the ground, and densely distributed small-hole air channels which are vertically and horizontally staggered are formed at a gap between second layer and third layer of fire bricks, so as to achieve the effects of ventilation and moisture removal; and meanwhile, the water-absorbing, disinfecting, and sterilizing effects of the lime powder are used for moisture absorption and pathogenic bacterium disinfection in an indoor environment. The present invention has reasonable structural design and obvious moisture-proof effect, and makes the indoor environment more suitable for people to live in by using the characteristic of being warm in winter and cool in summer of the fire bricks, so that the practicability is strong.

Figure 1:
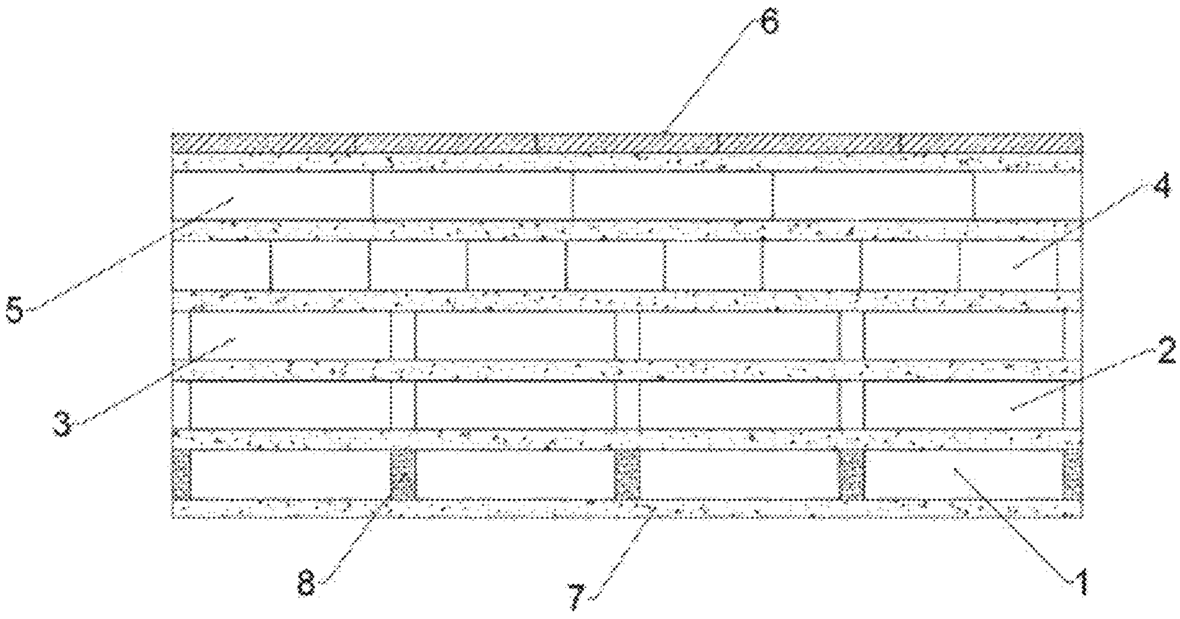
FIG. 1 is a schematic structural diagram of a moisture-proof structure of the present invention.

As shown in the figures, 1 refers to first fire brick layer, 2 refers to second fire brick layer, 3 refers to third fire brick layer, 4 refers to fourth fire brick layer, 5 refers to fifth fire brick layer, 6 refers to floor/ceramic tile layer, 7 refers to cement slurry, and 8 refers to lime powder.

DETAILED DESCRIPTION OF PREFERRED EMBODIMENTS

In order to make the objectives, technical solutions, and advantages of embodiments of the present invention clearer, the technical solution in the embodiments of the present invention will be described clearly and completely hereinafter with reference to the drawings in the embodiments of the present invention. Obviously, the described embodiments are some, but not all, embodiments of the present invention. Generally, the assemblies in the embodiments of the present invention described and illustrated in the drawings herein may be arranged and designed in various different configurations.

In the descriptions of the embodiments of the present invention, it should be noted that if the orientation or position relationship indicated by the terms "center", "upper", "lower", "left", "right", "vertical", "horizontal", "inner", "outer", and the like is based on the orientation or position relationship shown in the accompanying drawings, or the orientation or position relationship of the product of the present invention in use, it is only for the convenience of description of the present invention and simplification of the description, and it is not to indicate or imply that the indicated device or element must have a specific orientation, and be constructed and operated in a specific orientation. Therefore, the terms should not be understood as limiting the present invention. In addition, the terms "first", "second", "third", and the like are used for distinguishing description only and cannot be understood as indicating or implying relative importance.

In addition, the terms "horizontal", "vertical", "overhanging", and the like do not mean that the components are required to be absolutely horizontal or overhanging, but may be slightly inclined. For example, the term "horizontal" only means that the direction is more horizontal relative to "vertical", and does not mean that the structure must be completely horizontal, but may be slightly inclined.

In the descriptions of the embodiments of the present invention, the term "a plurality of" refers to being at least two.

In the descriptions of the embodiments of the present invention, it should also be noted that the terms "arrangement", "installation", "connected" and "connection" should be understood in a broad sense unless otherwise clearly specified and defined. For example, they may be fixed connection, removable connection or integrated connection; may be mechanical connection or electrical connection; and may be direct connection indirect connection through an intermediate medium, and connection inside two elements. The specific meanings of the above terms in the present invention may be understood in a specific case by those of ordinary skills in the art.

First Embodiment

Figure 2:
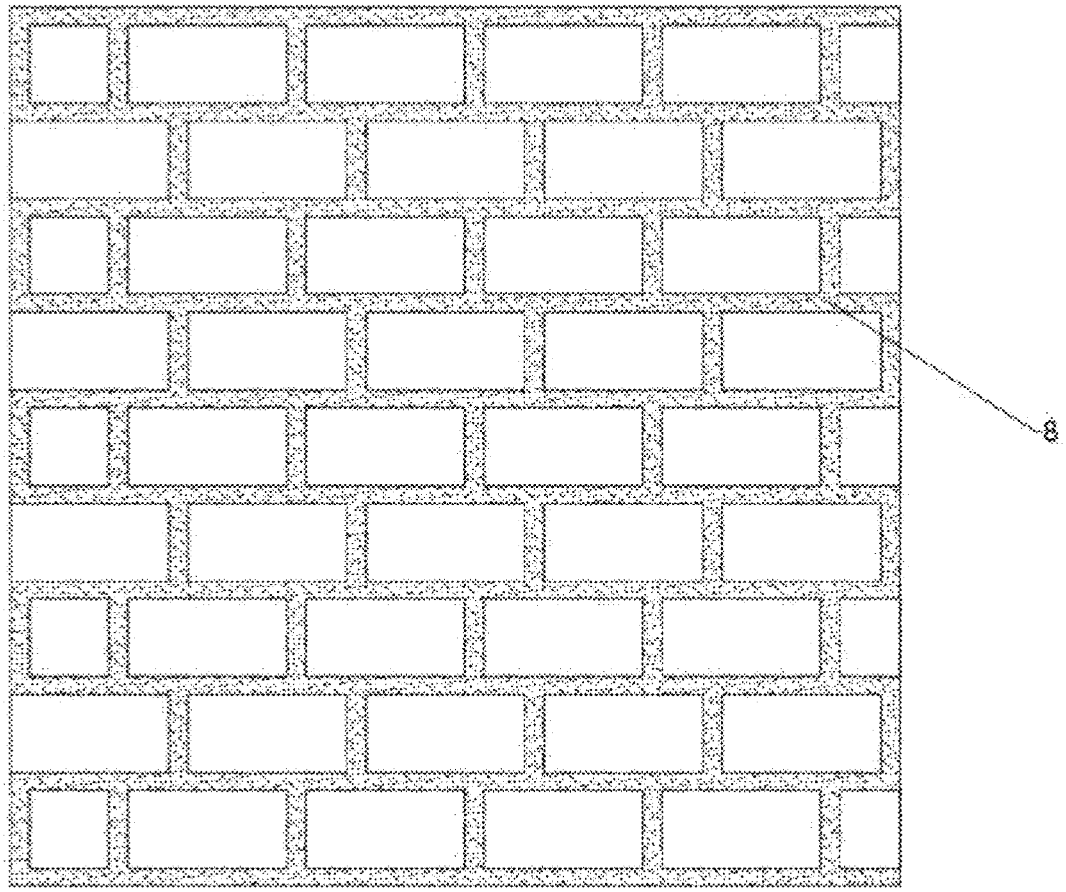
FIG. 2 is a plan view of a first fire brick layer of the moisture-proof structure of the present invention.
Figure 3:
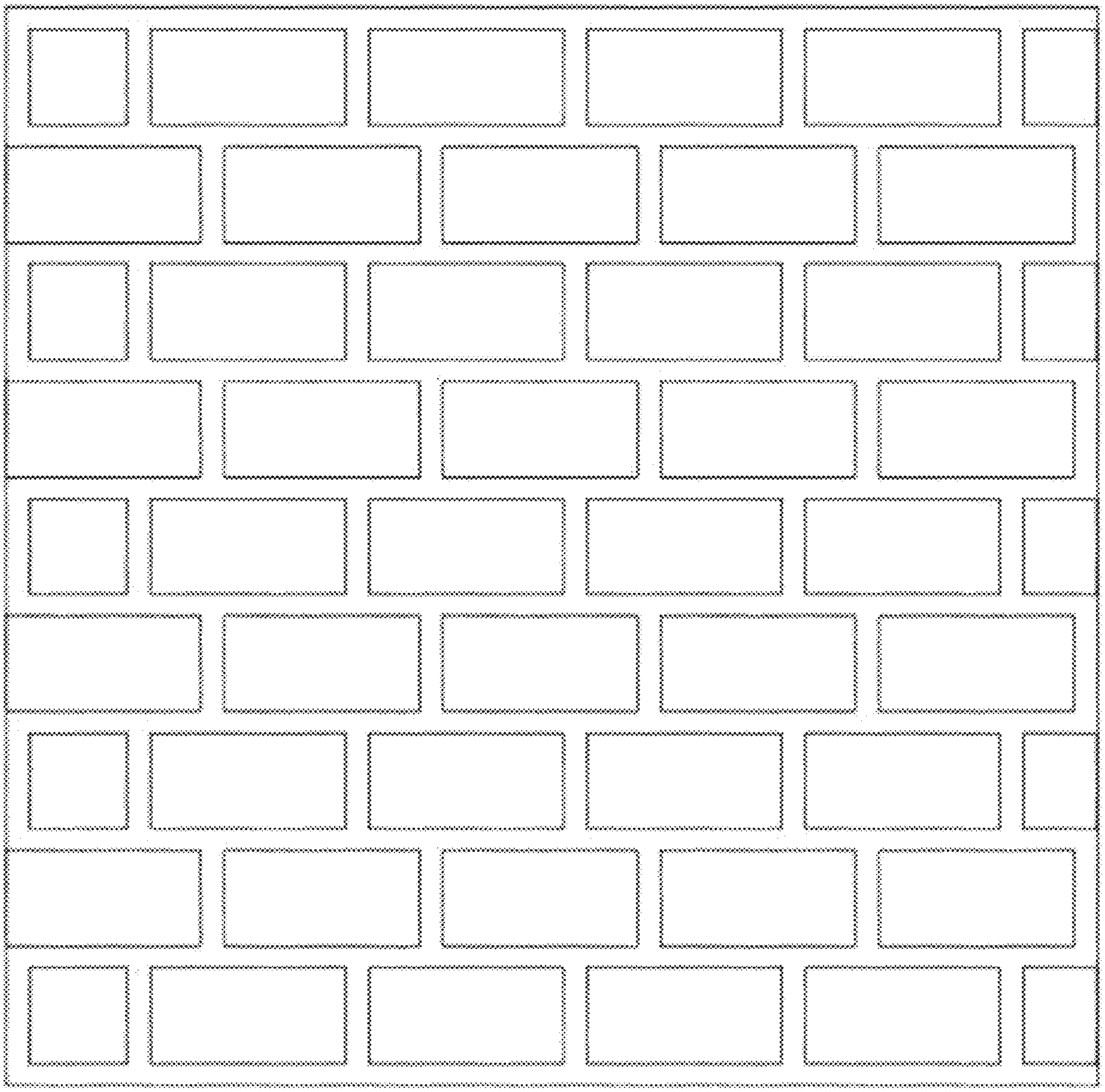
FIG. 3 is a plan view of a second fire brick layer and a third fire brick layer of the moisture-proof structure of the present invention.
Figure 4:
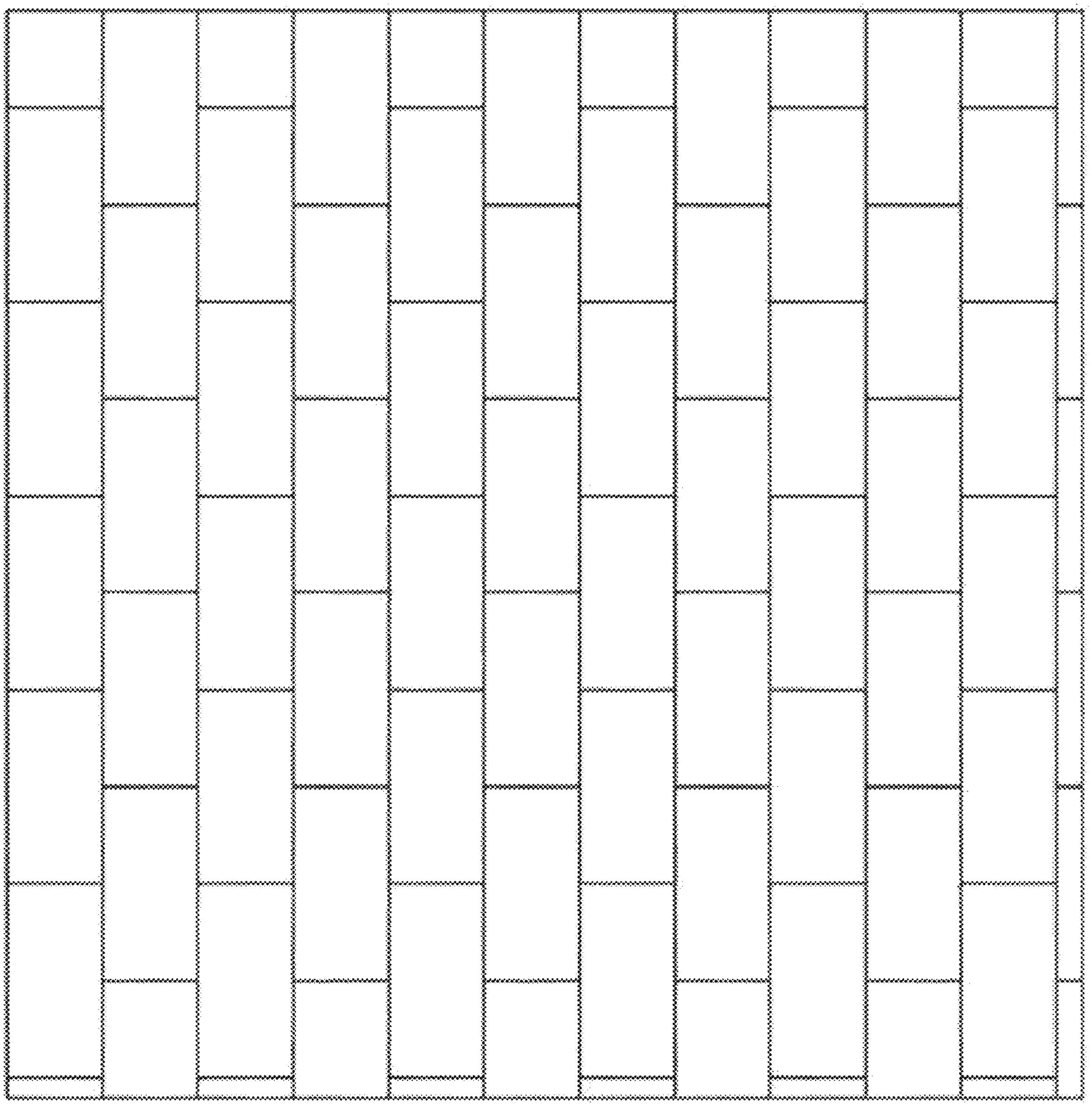
FIG. 4 is a plan view of a fourth fire brick layer of the moisture-proof structure of the present invention.
Figure 5:
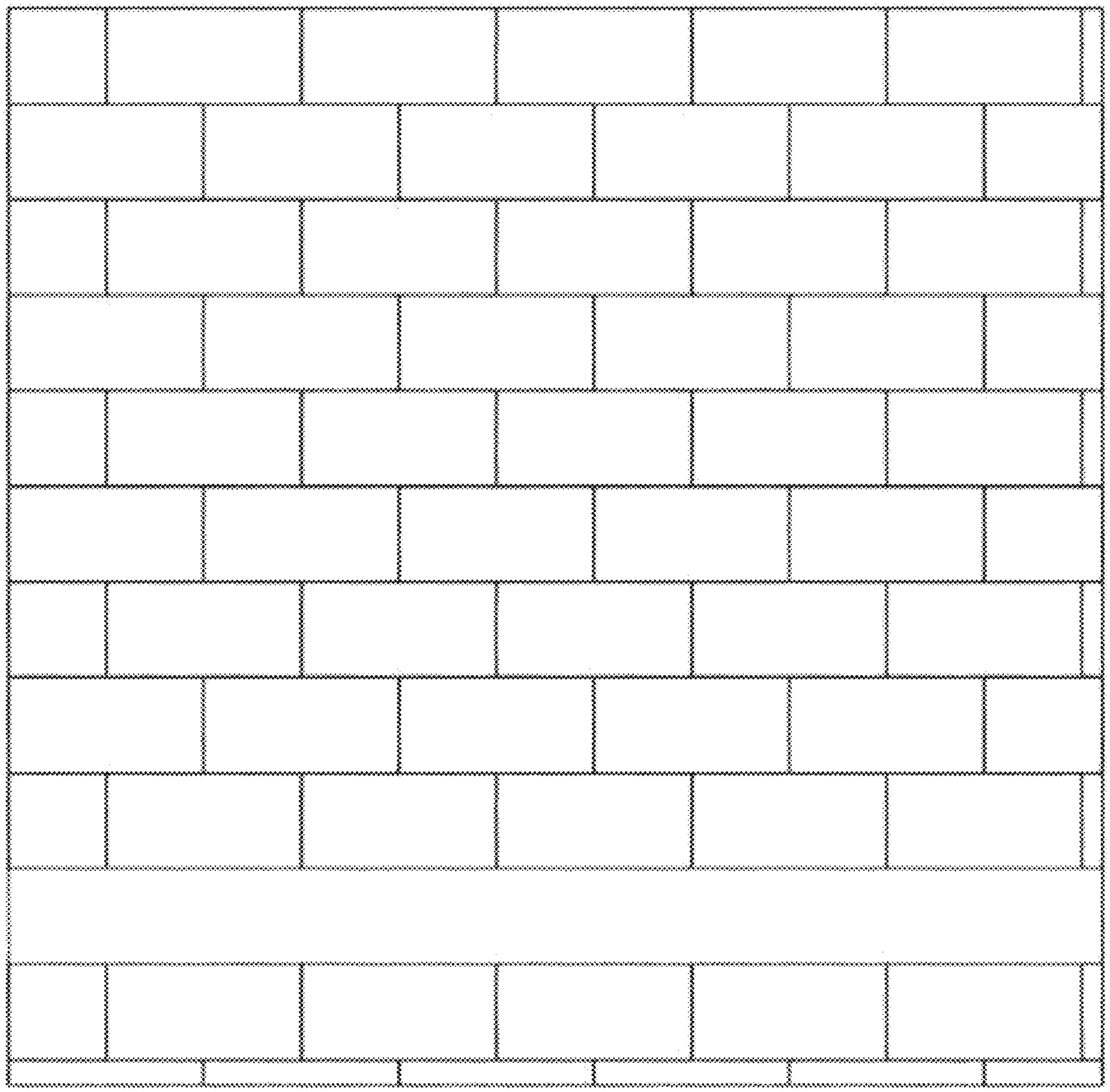
FIG. 5 is a plan view of a fifth fire brick layer of the moisture-proof structure of the present invention.

With reference to FIG. 1 to FIG. 5, a moisture-proof structure comprises a first fire brick layer 1, a second fire brick layer 2, a third fire brick layer 3, a fourth fire brick layer 4, a fifth fire brick layer 5, and a floor/ceramic tile layer 6 which are arranged from bottom to top;

wherein, the first fire brick layer 1, the second fire brick layer 2, the third fire brick layer 3, and the fifth fire brick layer 5 are all laid by using stretcher bond, the fourth fire brick layer 4 is laid by using a means of header bond, upper and lower layers of the first fire brick layer 1, the second fire brick layer 2, the third fire brick layer 3, the fourth fire brick layer 4, and the fifth fire brick layer 5 are bonded by using a cement slurry 7, a gap between fire bricks of the first fire brick layer 1 is filled with lime powder 8, and fire bricks of the fourth fire brick layer 4 and the fifth fire brick layer 5 are closely connected.

According to a preferred embodiment of the present invention, the cement slurry 7 is formed by mixing cement with river sand at a ratio of 7:3.

According to a preferred embodiment of the present invention, the fire brick is baked with strong fire.

According to a preferred embodiment of the present invention, when the floor/ceramic tile layer 6 is laid with a wooden floor, a lime layer is laid between the floor/ceramic tile layer and the fifth fire brick layer 5.

In specific implementation of the present invention, a chalk line is formed according to a size first, and then the following steps are operated:

1) the cement is uniformly mixed with the river sand at the ratio of 7:3, and the mixture is added with a proper amount of water and mixed uniformly to be in a waxy and non-flowing state;
2) a proper amount of cement slurry is placed on the fire bricks, the first fire brick layer, the second fire brick layer and the third fire brick layer are sequentially laid according to the size, and during laying, the gap between the fire bricks of the first fire brick layer is filled with the lime powder, and the small-hole air channels for ventilation and exhaust are formed at the gap between the fire bricks of the second fire brick layer and the third fire brick layer;
3) after the first three layers are laid, the fourth fire brick layer is laid by using a means of header bond, and the fire bricks are closely connected; and
4) the fifth fire brick layer is laid by using stretcher bond, the fire bricks of the fifth fire brick layer are closely connected, then the lime layer is laid on the fifth fire brick layer, and the wooden floor is mounted on the lime layer.

Second Embodiment

With reference to FIG. 1 to FIG. 5, a moisture-proof structure comprises a first fire brick layer 1, a second fire brick layer 2, a third fire brick layer 3, a fourth fire brick layer 4, a fifth fire brick layer 5, and a floor/ceramic tile layer 6 which are arranged from bottom to top;

wherein, the first fire brick layer 1, the second fire brick layer 2, the third fire brick layer 3, and the fifth fire brick layer 5 are all laid by using stretcher bond, the fourth fire brick layer 4 is laid by using a means of header bond, upper and lower layers of the first fire brick layer 1, the second fire brick layer 2, the third fire brick layer 3, the fourth fire brick layer 4, and the fifth fire brick layer 5 are bonded by using a cement slurry 7, a gap between fire bricks of the first fire brick layer 1 is filled with lime powder 8, and fire bricks of the fourth fire brick layer 4 and the fifth fire brick layer 5 are closely connected.

According to a preferred embodiment of the present invention, the cement slurry 7 is formed by mixing cement with river sand at a ratio of 7:3.

According to a preferred embodiment of the present invention, the fire brick is baked with strong fire.

According to a preferred embodiment of the present invention, when the floor/ceramic tile layer 6 is laid with ceramic tiles, a cement mortar is laid between the floor/ceramic tile layer and the fifth fire brick layer 5.

In specific implementation of the present invention, a chalk line is formed according to a size first, and then the following steps are operated:

1) the cement is uniformly mixed with the river sand at the ratio of 7:3, and the mixture is added with a proper amount of water and mixed uniformly to be in a waxy and non-flowing state;
2) a proper amount of cement slurry is placed on the fire bricks, the first fire brick layer, the second fire brick layer and the third fire brick layer are sequentially laid according to the size, and during laying, the gap between the fire bricks of the first fire brick layer is filled with the lime powder, and the small-hole air channels for ventilation and exhaust are formed at the gap between the fire bricks of the second fire brick layer and the third fire brick layer;
3) after the first three layers are laid, the fourth fire brick layer is laid by using a means of header bond, and the fire bricks are closely connected; and
4) the fifth fire brick layer is laid by using stretcher bond, the fire bricks of the fifth fire brick layer are closely connected, and then the ceramic tiles are laid on the fifth fire brick layer.

The present invention and its embodiments have been described above, and the description is not limited. What is shown in the drawings is only one of the embodiments of the present invention, and the actual structure is not limited to this. Generally speaking, if those of ordinary skills in the art are inspired by it, the structural modes and embodiments that are similar to the technical solution and designed without creativity in the case of not deviating from the creative purpose of the present invention should all belong to the scope of protection of the present invention.

We claim:

1. A moisture-proof structure, comprising a first fire brick layer (1), a second fire brick layer (2), a third fire brick layer (3), a fourth fire brick layer (4), a fifth fire brick layer (5), and a surface layer (6) which are arranged from bottom to top;

wherein, the first fire brick layer (1), the second fire brick layer (2), the third fire brick layer (3), and the fifth fire brick layer (5) are all arranged in a stretcher bond pattern, the fourth fire brick layer (4) is arranged in a header bond pattern, upper and lower layers of the first fire brick layer (1), the second fire brick layer (2), the third fire brick layer (3), the fourth fire brick layer (4), and the fifth fire brick layer (5) are bonded with a cement slurry (7), a gap between fire bricks of the first fire brick layer (1) is filled with lime powder (8), fire bricks of the fourth fire brick layer (4) and the fifth fire brick layer (5) are closely connected, gaps between adjacent fire bricks in the second fire brick layer are transversely offset relative to gaps between adjacent fire bricks in the third fire brick layer, and the surface layer (6) is selected from a wooden floor layer or a ceramic tile layer.

2. The moisture-proof structure according to claim 1, wherein the cement slurry (7) is formed by mixing cement with river sand at a ratio of 7:3.

3. The moisture-proof structure according to claim 1, wherein, when the surface layer (6) is the wooden floor layer, a lime layer is laid between the surface layer and the fifth fire brick layer (5).

4. The moisture-proof structure according to claim 1, wherein, when the surface layer (6) is the ceramic tile layer, a cement mortar is laid between the surface layer and the fifth fire brick layer (5).

* * * * *